(12) United States Patent
Lebo et al.

(10) Patent No.: US 7,717,479 B2
(45) Date of Patent: May 18, 2010

(54) TIGHTENABLE BAND CLAMP

(75) Inventors: Goran Lebo, Offenbach/Main (DE); Detlef Henrich, Limeshain (DE); Heinz Peter Wolf, Bad Soden-Salmünster (DE); Stephan Mann, Bieber (DE)

(73) Assignee: NORMA Germany GmbH, Maintal (DE)

( * ) Notice: Subject to any disclaimer, the term of this patent is extended or adjusted under 35 U.S.C. 154(b) by 0 days.

(21) Appl. No.: 11/999,980

(22) Filed: Dec. 7, 2007

(65) Prior Publication Data

US 2008/0136184 A1    Jun. 12, 2008

(30) Foreign Application Priority Data

Dec. 8, 2006    (DE) .................. 10 2006 057 881

(51) Int. Cl.
*F16L 25/00*    (2006.01)
(52) U.S. Cl. .................. 285/420; 285/252; 285/407
(58) Field of Classification Search .................. 285/403, 285/420, 252, 365, 407
See application file for complete search history.

(56) References Cited

U.S. PATENT DOCUMENTS

| 494,996 | A | * | 4/1893 | Dwelle .................. 285/419 |
| 4,463,975 | A | | 8/1984 | McCord |
| 4,606,111 | A | * | 8/1986 | Okazaki et al. .................. 29/463 |
| 6,199,921 | B1 | | 3/2001 | Cassel et al. |
| 2006/0071471 | A1 | | 4/2006 | Ignaczak et al. |
| 2008/0184536 | A1 | | 8/2008 | Rigollet et al. |

FOREIGN PATENT DOCUMENTS

| DE | 2 028 347 | 12/1971 |
| DE | 7 318 983 | 5/1973 |
| DE | 29 19 939 | 11/1980 |
| DE | 199 28 434 | 4/2000 |
| DE | 199 06 946 | 11/2000 |
| DE | 202 01 660 | 5/2002 |
| DE | 102 56 912 | 6/2004 |
| DE | 102004004690 | 8/2005 |
| GB | 2 153 899 | 8/1985 |

* cited by examiner

*Primary Examiner*—Aaron M Dunwoody
*Assistant Examiner*—Fannie Kee
(74) *Attorney, Agent, or Firm*—Friedrich Kueffner

(57) ABSTRACT

A tightenable band clamp with a clamping band and a tightening head with two clamping jaws which are a certain circumferential distance apart and which can be moved toward each other by a tightening device. For this purpose, at least one clamping jaw, in the area of its radially inside surface, has at least one projection which extends in the circumferential direction toward the other clamping jaw and which projects into the gap.

10 Claims, 2 Drawing Sheets

TIGHTENABLE BAND CLAMP

BACKGROUND OF THE INVENTION

1. Field of the Invention

The present invention relates to a tightenable band clamp with a clamping band and a tightening head with two clamping jaws, which are arranged a certain circumferential distance apart and which can be moved toward each other by a tightening device.

The invention also pertains to a pipe connection with an inner pipe, which is inserted into an outer pipe, and with a band clamp, which is tightened around the outer pipe, where the outer pipe has at least two slots that extend from its end surface.

2. Description of the Related Art

A band clamp of this type and a pipe connection of this type are known from US 2006/0071471 A1. The band clamp is used to tighten the outer pipe, at least in the area where the slots are, onto the outside circumference of the inner pipe. A pipe connection of this type should be as leakproof as possible, especially when a pipe connection of this type is used in gas-carrying systems such as mufflers. "Leakproof" means that the smallest possible gaps through which the gas or liquid can escape remain between the inner pipe and the outer pipe.

The outside diameter of the inner pipe and the inside diameter of the outer pipe are relatively well matched to each other in the area where the two pipes overlap. Nevertheless, there usually remains a certain gap between them. This is based not only on manufacturing tolerances but also on the need to keep the amount of force required to insert the inner pipe into the outer pipe within acceptable limits.

When the band clamp is tightened, that is, when the tightening device is actuated to move the clamping jaws toward each other, the inside diameter of the outer pipe is decreased, because the outside pipe is pulled together slightly. Nevertheless, this contraction, that is, this reduction in the diameter of the clamping band, also causes the area of the outer pipe located between the two clamping jaws to bulge outward. At this point, a slit is formed, which often leads to a leak in the pipe connection even though the band clamp has been firmly tightened.

It has therefore been proposed in the previously mentioned US 2006/0071471 A1 that an intermediate piece be provided between the two clamping jaws. This piece presses on the outer pipe in the area between the two clamping jaws and thus prevents the outer pipe from bulging outward. A design of this type is unfavorable, however. During the production of a band clamp of this type, it is necessary to manage an additional element. This element, furthermore, must be placed more-or-less in the center between the two clamping jaws before the band clamp is tightened. As a result, after the tightening device has been loosened again, the intermediate element does not remain automatically in the correct position, which means that a band clamp of this type can, in principle, be used only once. Reinstalling it requires that the intermediate piece be repositioned beforehand.

SUMMARY OF THE INVENTION

The invention is based on the object of being able to create with little effort a pipe connection which is as leakproof as possible.

This object is met in the case of a tightenable band clamp of the type described above in that, in the area of its radially inside surface, at least one clamping jaw has at least one projection which extends circumferentially toward the other clamping jaw and projects into the gap.

In this configuration, account is taken of the fact that, without taking additional measures on the radially inside surface of the clamping jaws, the jaws cannot in practice be brought as far as the diameter on which the rest of the inside surface of the clamping band rests. A clamping jaw of this type is formed, for example, by bending the end of the clamping band outward into a semicircle. When a projection is now provided in the area of the radially inside surface of the clamping jaw, a hold-down piece permanently connected to the clamping jaw is obtained. When the clamp is tightened, this hold-down piece presses down on the outer pipe and holds it down, thus preventing it from bulging outward. This projection does not necessarily have to bridge the entire gap, although it is advantageous for the projection and a projection possibly arranged on the other clamping jaw and pointing toward the first projection to rest against each other and thus to prevent the outward bulging of the outer pipe when the tightening device is tightened. The band clamp still functions satisfactorily even if a gap remains between the two projections as long as this gap is small enough to prevent the previously mentioned outward bulging of the outer pipe.

It is preferable for the projection to be designed as an extension of the clamping band in the circumferential direction. In other words, the inside surface of the projection is flush with the inside surface of the clamping band. This prevents the formation of a step on the inside surface of the clamp, into which the material of the outer pipe could flow. The surface by which the band clamp rests externally on the outer pipe is thus made longer.

The projection is preferably made as an integral part of the clamping jaw. This facilitates manufacturing, because there is no need to deal with additional parts, and in addition handling is simpler, because there are no parts which could be lost.

The clamping jaw is preferably made out of sheet metal, at least in the area of the projection, and the projection itself is formed by a pleat in the sheet metal. If the clamping jaw is formed out of sheet metal at least in the area of the projection, the clamping jaw can be made as an integral part of the clamping band, which facilitates both manufacturing and handling. A pleat can be easily formed in the sheet metal with little effort, so that the projection can be produced with only a minor amount of extra work.

The pleat is preferably constructed as a runner extending in the circumferential direction. The runner therefore has as certain length in the circumferential direction with which it can act on the outer pipe. A runner can slide along the outside circumference of the outer pipe during the tightening operation, so that the tightening action is not impeded by the projection.

The clamping jaw preferably has two projections, one of which is located axially on one side of the tightening device, the other on the other side. This offers several advantages. First, the band clamp can be supported symmetrically on both sides of the tightening device, which reduces the danger that the band clamp could tip on the outer pipe. Second, the tightening device, e.g., a threaded pin, imposes little or no limitation on the radial dimension of the projection, which means that the projection can be made sufficiently tall in the radial direction. The projection can thus be made sturdy enough to transmit the forces necessary to hold down the outer pipe on the inner pipe in the area between the two clamping jaws.

The clamping jaws preferably have cooperating projections, which are arranged in the same axial positions. In other words, each clamping jaw has at least one projection, where the projection on the one jaw is directly opposite the projection on the other. In this configuration, the remaining gap between the clamping jaws can be kept very small.

The clamping jaws preferably have initial contact zones in the area of their radially outer surfaces. When the tightening device is tightened, it is the surfaces in these zones which come to rest against each other first. Initial contact zones of this type increase the force with which the clamping band can be tightened. The clamping jaws are first brought closer to each other with the help of the tightening device until they come to rest against each other in the area of the initial contact zones. In the area of the initial contact zones, i.e., in the radially outer area, it is therefore impossible for the clamping jaws to approach each other any farther. When the tightening device is then actuated again, the contact area in the initial contact zones of the two clamping jaws serves as a pivot axis, around which the two clamping jaws are pivoted toward each other. Thus the clamping force with which the clamping band is tightened can be made relatively powerful by simple means.

The clamping band preferably has a V-shaped cross section at least along part of its length, the angle of the "V" pointing radially inward. With this design, the band clamp can be made to rest flat on the inner pipe when the band clamp is arranged so that it also overlaps the end of the outer pipe. In this case, one sidepiece of the V can be tightened flat onto the section of the inner pipe which projects from the outer pipe, whereas the other sidepiece of the V clamps the outer pipe onto the inner pipe and conically deforms it. Thus a pipe connection can be easily achieved which is also highly leakproof. The band clamp can also be positioned in its entirety on the outer pipe. In this case, the clamping band with its V-shaped cross section is able to deform part of the slotted section of the outer pipe conically and to deform the remaining part, i.e., the part adjacent to the end surface, cylindrically, so that in this area the outer pipe rests flat on the circumference of the inner pipe. This improves the leaktightness even more.

It is preferable for the cross section to enclose an angle in the range of 160-176°. The V therefore has a relatively wide opening.

The object of the invention is accomplished in the case of a pipe connection in that the band clamp is constructed as described above. The outer pipe can then be tightened onto the inner pipe without causing excessive outward bulging of the outer pipe and thus without allowing a relatively large gap to form, through which the medium could escape.

It is preferable for the slots to have two walls on their circumferential sides and for at least one slot to have a bridge, which connects these two side walls of the slot. When the band is tightened, the bridge is deformed into the slot. The slots are necessary so that the inside diameter of the outer pipe can be deformed sufficiently, which allows in turn the outer pipe to be clamped tightly to the inner pipe. Unless further measures are taken, however, these slots give rise to a gap, through which the gas, for example, which is flowing through the pipe, can escape to the outside. If a bridge is now provided in the slot, that is, if a web is provided, which is allowed to remain when the slot is produced, the two side walls of the slot can still be squeezed together to decrease the inside diameter of the outer pipe. But because the bridge is deformed when the two side walls approach each other and because, as a result of the side walls on the one hand and the inner pipe and the band clamp on the other, this deformation can occur in practice only along the slot, the bridge forms a seal, by means of which the slot is therefore almost completely sealed off. This is a relatively simple measure for making the pipe connection leaktight in spite of the presence of the slots.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
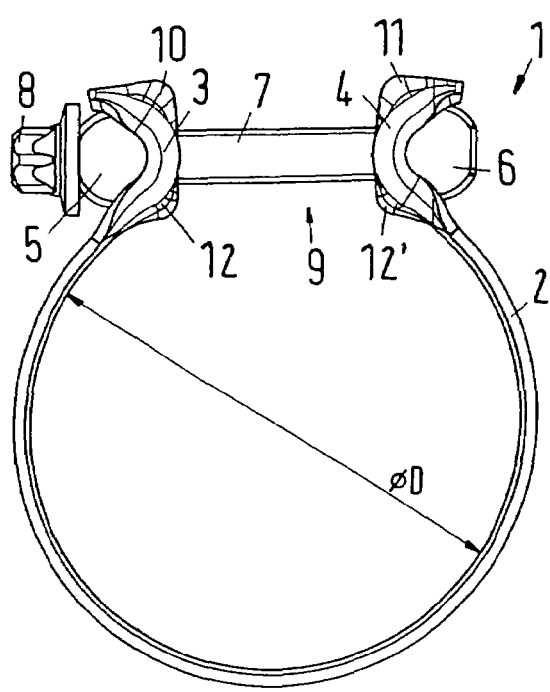
FIG. 1 is a front view of a tightenable band clamp.

FIG. 1 shows a tightenable band clamp 1 with a clamping band 2, which is bent more-or-less into a circle and has an inside diameter D.

The clamping band 2 is provided at each end with a clamping jaw 3, 4. The clamping jaws 3, 4 are connected integrally to the clamping band 2. The clamping band 2 is made out of metal, or, more precisely, out of sheet metal. The clamping jaws 3, 4 are bent outward from the ends of the clamping band 2.

In each clamping jaw 3, 4, a cylindrical pin 5, 6 is provided. A tightening screw 7 with a head 8 is inserted through the one cylindrical pin 5 and screwed into the other cylindrical pin 6. As the tightening screw 7 is screwed farther into the cylindrical pin 6, the gap 9 between the two clamping jaws 3, 4 becomes progressively smaller. Thus the inside diameter D of the clamp band 2 is decreased. The tightening screw 7 can be tightened so far that the clamping jaws 3, 4 will form a solid block, that is, rest against each other.

In the untightened state, which is shown in FIG. 1, the clamping jaws 3, 4 are a certain distance apart in the circumferential direction of the band clamp 2. When the tightening screw 7, which forms here the tightening device, is turned, the two clamping jaws 3, 4 approach each other and come to rest against each other in an initial contact zone 10, 11. Upon further actuation of the tightening screw 7, the initial contact zone 10, 11 serves as an axis of rotation, around which the two clamping jaws 3, 4 can pivot toward each other.

Because the ends of the clamping band 2 are bent in practically circular fashion to form the clamping jaws 3, 4, an undesirable gap remains in the radially inner section between the clamping jaws 3, 4, even after the band clamp has been fully tightened. The remedy for this is described in the following.

Figure 5:
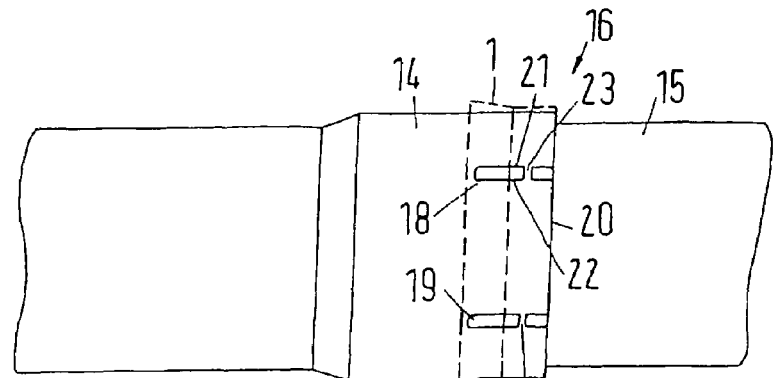
FIG. 5 shows a pipe connection.

Each clamping jaw 3, 4 is provided with two projections 12, 13; 12', 13' on its radially inside surface. The projections 12, 13; 12', 13' represent circumferential extensions of the inside wall of the clamping band 2. Because the clamping jaws 3, 4 are formed out of sheet metal, the projections 12, 13; 12', 13' can be made as pleats designed in the form of runners extending in the circumferential direction. When the clamping jaws 3, 4 approach each other, the projections 12, 13; 12', 13' on the clamping jaw 3 and the corresponding projections 12', 13' on the clamping jaw 4 then also move toward each other, and after the two clamping jaws 3, 4 have been squeezed together into a block, there is no longer any gap between the projections 12, 12' and 13, 13' and the corresponding opposite projection, or in any case the gap is so small that the part of an outer pipe 14 which has been pushed onto the inner pipe 15 (FIG. 5) cannot bulge radially outward. This in turn prevents the formation of a gap between the outer pipe 14 and the inner pipe 15 which could allow leakage from the pipe connection 16 (FIG. 5). The projection 13' on the jaw 4 is not shown in the drawings but is identical to the projection 13 on the jaw 3.

Figure 2:
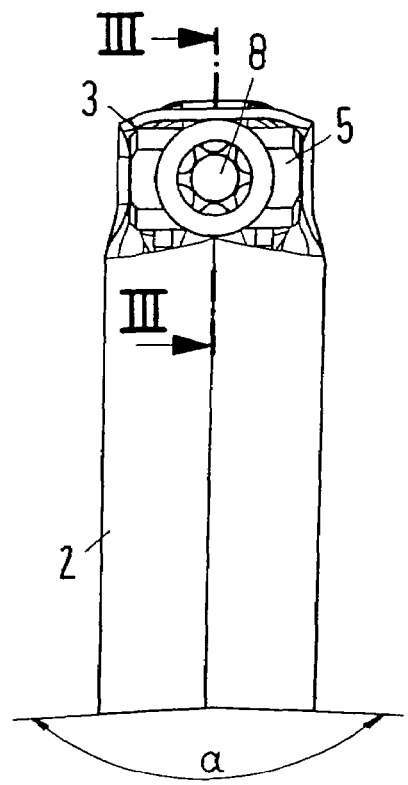
FIG. 2 is a side view of the band clamp.
Figure 3:
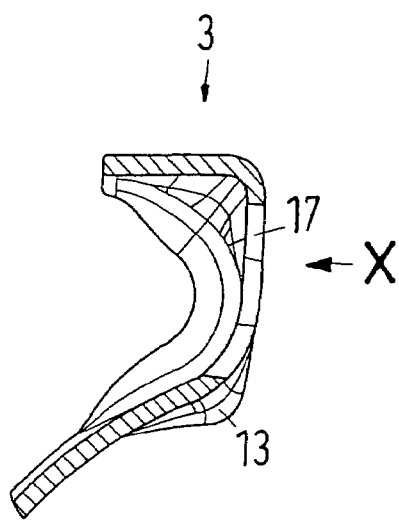
FIG. 3 is an enlarged cross sectional view taken along III-III of FIG. 2.
Figure 4:
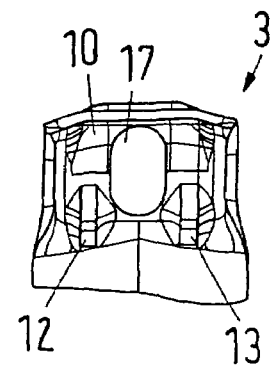
FIG. 4 is a view in the direction X according to FIG. 3.

In the axial direction of the band clamp (that is, the direction perpendicular to the plane of the drawing of FIG. 2), the two projections 12, 13 flank the tightening screw 7 and therefore flank an opening 17, through which the tightening screw 7 is guided. Thus it is possible to allow the two projections 12, 13 to overlap the opening 17 in the radial direction (that is, the direction of the diameter D), so that the tightening screw 7 imposes little if any limitation on the radial dimension of the projections 12, 13. The projections 12, 12' are located in the same position in the axial direction; that is, they are situated opposite each other. In the ideal case, the projections 12, 12' almost butt up against each other after the band clamp 1 has been squeezed into a block.

FIG. 5 shows a pipe connection 16 between an outer pipe 14 and an inner pipe 15, which has been inserted into the outer pipe. The outer pipe 14, as illustrated, can be provided with a section of expanded diameter. It is also possible, however, for the entire outer pipe 14 to have an inside diameter which matches the outside diameter of the inner pipe 15.

The band clamp 1 is illustrated only in schematic fashion in broken line.

So that the outer pipe can be tightened onto the inner pipe, the outer pipe 14 has two slots 18, 19, which extend from an end surface of the outer pipe 14. The two slots 18, 19 are offset from each other by about 90° in the circumferential direction of the outer pipe 14.

Each slot 18, 19 has two side walls 21, 22; these side walls 21, 22 can extend in the axial direction, for example. The two side walls 21, 22 are connected to each other by a bridge 23. This bridge 23 can be easily allowed to remain when the slots 18, 19 are punched out. If necessary, this bridge 23 can also have a curvature in the axial direction. The direction in which the curvature points is immaterial.

When the band clamp 1 is now tightened, the width of the slots 18, 19 is reduced in the circumferential direction. The bridge 23 is deformed. The material of the bridge 23 cannot, however, escape in the radially inward direction, because that is where the inner pipe 15 is located, nor can it escape in the radially outward direction, because that is where the clamping band 2 of the band clamp 1 is located. Accordingly, it can flow only inside the slot 18, 19. The bridge 23 then forms a kind of seal or plug, which blocks off the slots 18, 19. The slots 18, 19 are sealed or remain sealed, so that the slots 18, 19 cannot contribute to any leakage in the pipe connection 16.

As can be seen especially clearly in FIG. 2, the band clamp 2 has a V-shaped cross section at least over a part of its circumference. Preferably, however, the V-shaped cross section extends over the entire length of the clamping band. The V has a relatively large angle α. This can be in the range of 160-176°. The way in which this cross section works is explained on the basis of FIGS. 6 and 7.

Figure 6:
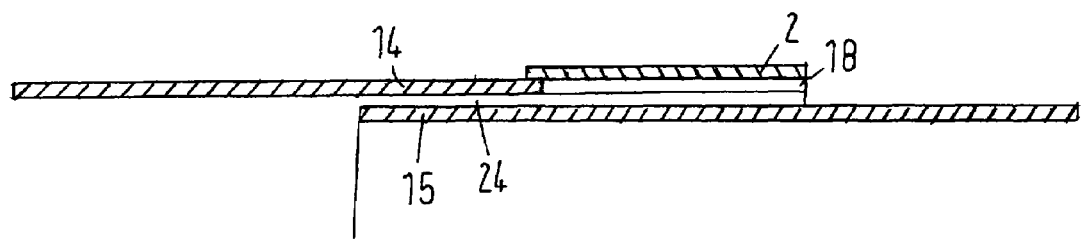
FIG. 6 is a schematic diagram of a pipe connection in the untightened state.
Figure 7:
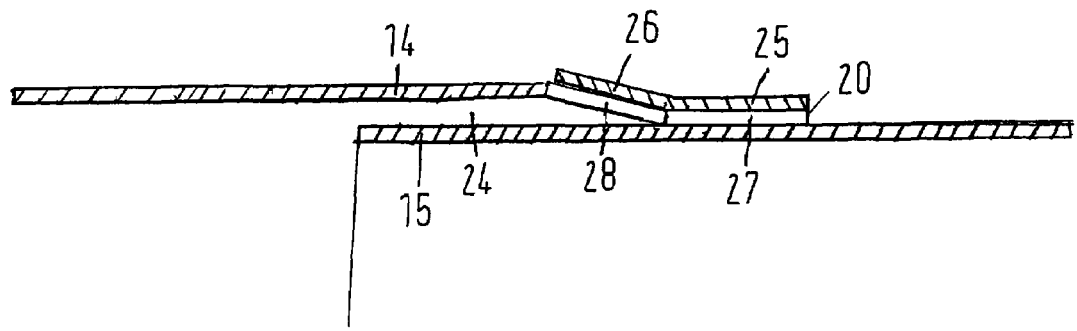
FIG. 7 shows the pipe connection in the tightened state.

FIGS. 6 and 7 show in schematic fashion the outer pipe 14 and the inner pipe 15 with a clearance 24 between them. This clearance 24 can be on the order of 1-2 mm. It is attributable to manufacturing tolerances. At the same time, however, this clearance 24 makes it easier for the inner pipe 15 to be inserted into the outer pipe 14.

By tightening the clamping band 2, the outer pipe 14 can be deformed in the area of the clamping band 2 in such a way that it rests as tightly as possible on the outside circumference of the inner pipe 15. This can be easily realized by the V-shaped cross section of the clamping band 2. What is shown is the outer pipe 14 in the area of the slot 18, although the bridge 23 has been omitted for the sake of clarity.

When the clamping band 2 is tightened, one sidepiece 25 of the V-shaped cross section remains parallel to the circumferential surface of the outer pipe 15, whereas the other sidepiece 26 of the V-shaped cross section forms a cone. Accordingly, a section 27 of the outer pipe 14 which proceeds from the end surface 20 is deformed into a shape conforming approximately to the lateral surface of a cylinder, whereas the section 28 farther away in the axial direction from the end surface 20 is deformed into a cone. The angle which this section 28 forms with the circumferential wall is steeper than that which would be formed if the entire area covered by clamping band 2 were tightened. This is not important, however, because the section 27 can rest flat on the circumference of the inner pipe and thus contributes to an improved seal.

While specific embodiments of the invention have been described in detail to illustrate the inventive principles, it will be understood that the invention may be embodied otherwise without departing from such principles.

We claim:

1. A tightenable band clamp comprising:
 a clamping band; and
 a tightening head with two clamping jaws arranged a certain circumferential distance apart so as to form a gap, and wherein the clamping jaws can be moved toward each other by a tightening device, wherein at least one clamping jaw has, in the area of a radially inside surface thereof, at least one projection extending toward the other clamping jaw and projecting into the gap, wherein the clamping jaw is of sheet metal at least in an area of the projection, the projection being formed by a pleat, wherein the clamping jaws have cooperating projections arranged in the same axial position.

2. The band clamp according to claim 1, wherein the projection is an extension of the clamping band in the circumferential direction.

3. The band clamp according to claim 1, wherein the projection is an integral part of the clamping jaw.

4. The band clamp according to claim 1, wherein the pleat is a runner extending in the circumferential direction.

5. The band clamp according to claim 1, wherein the clamping jaw has two projections located axially on both sides of the tightening device.

6. The band clamp according to claim 1, wherein, in the area of their radially outside surfaces, the clamping jaws have initial contact zones where the jaws first come into contact with each other when the tightening device is tightened.

7. The band clamp according to claim 1, wherein the clamping band has a V-shaped cross section over at least part of a length thereof, the angle of which points radially inward.

8. The band clamp according to claim 7, wherein the cross section encloses an angle in the range of 160-176°, the V thus having a relatively large opening.

9. A pipe connection, comprising:
 an outer pipe;
 an inner pipe inserted into the outer pipe; and a band clamp tightened onto the outer pipe, wherein the outer pipe has at least two slots proceeding from an end surface thereof, and wherein the band clamp is a tightenable band clamp comprising a clamping band and a tightening head with two clamping jaws arranged a certain circumferential distance apart so as to form a gap, and wherein the clamping jaws can be moved toward each other by a tightening device, wherein at least one clamping jaw has, in the area of a radially inside surface thereof, at least one projection extending toward the other clamping jaw and projecting into the gap, the projection being formed by a pleat, wherein the clamping jaws have cooperating projections arranged in the same axial position.

10. The pipe connection according to claim 9, wherein the slots each have two walls on their circumferential sides, and where at least one slot has a bridge connecting the two side walls of the slot, the bridge being deformed into the slot when the clamp is tightened.

* * * * *